Aug. 22, 1939.   R. SCHUMANN   2,170,036
SMALL ELECTRIC MACHINE TOOL
Filed March 19, 1937
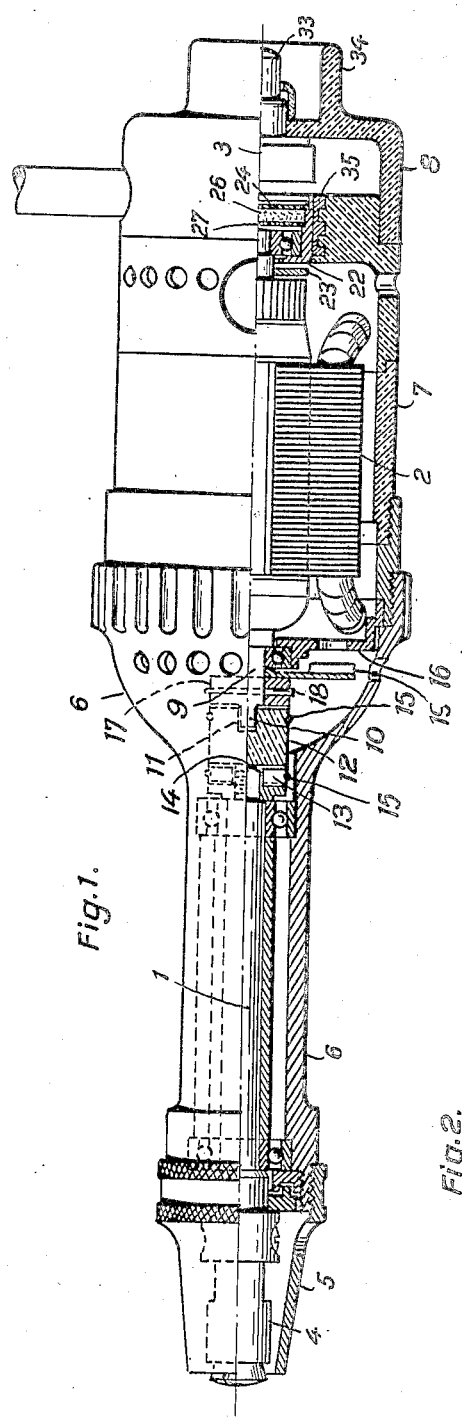
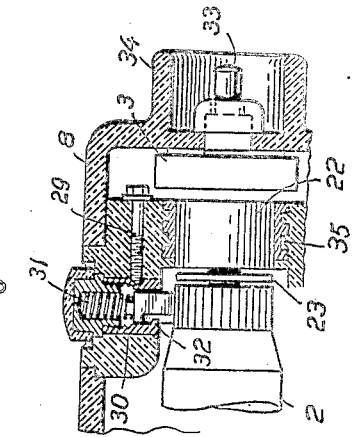
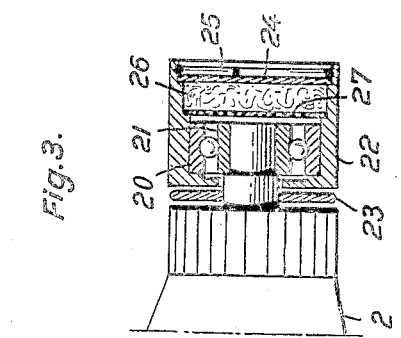
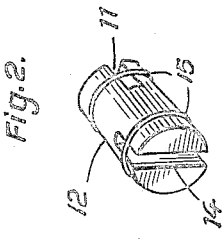
Inventor:
Robert Schumann
by
his Attorney Patented Aug. 22, 1939

2,170,036

UNITED STATES PATENT OFFICE 2,170,036

SMALL ELECTRIC MACHINE TOOL

Robert Schumann, Dusseldorf, Germany

Application March 19, 1937, Serial No. 131,872
In Germany March 26, 1936

4 Claims. (Cl. 308—187)

This invention relates to a small electric machine tool for grinding, milling, drilling and the like, and has for its object to produce a particularly light small electric machine tool which can be assembled and disassembled very easily and is characterized by great reliability in operation.

The small electric machine tool according to the invention comprises a casing in the form of a hand tool, yet both this casing and a protecting sleeve surrounding the chuck are made entirely of insulating material and accommodate the switch, motor, driving spindle and all its parts.

The motor armature shaft and working spindle are connected by a coupling piece of insulating material in that the motor shaft and the working spindle have tongue-shaped projections which engage in radial slots in the insulating piece with play both in radial and axial direction. These slots may be mutually displaced for example through an angle of 90° and are provided in the front and rear ends of the coupling piece. The radial play of the coupling is limited in its slots by rings, which surround the slotted portions of the coupling piece. The result is, that vibrations and shocks of the working spindle cannot be transmitted to the motor armature shaft or from this shaft again, to the working spindle, and that the coupling piece can adjust itself like a free axle when the tool is running. The casing of insulating material and the internal construction of the machine consist of two parts which can always be easily and quickly disassembled and assembled. The rear part of the casing (motor and switch compartment) accommodates the motor with all its parts including the bearings, fan and switch, whereas the front part held on the rear part by a screw connection, bayonet joint or the like is conical (in the example illustrated bell shaped) and merges at its rear end into a cylindrical portion which extends into the protecting sleeve surrounding the chuck and so forth and accommodates the working spindle with its bearings and the clamping device, chuck or the like.

This construction presents the great advantage that, after the removal of the front part of the casing, the tongue of the working spindle disengaging already at this occasion from the coupling which can also be pulled off the motor shaft, the motor armature with its two ball bearings specially constructed for this purpose, and after the removal of the brushes the fan and coupling can immediately be removed—and again fitted together ready for use just as quickly. Furthermore, the arrangement of the insulating material casing and the internal parts according to the invention afford reliable protection of the operator against contact with the electricity conductive parts.

Other features and advantages of the invention will be hereinafter described with reference to the accompanying drawing which illustrates, by way of example, an embodiment of the invention.

In the drawing:

Fig. 1 shows the small electric machine tool in longitudinal section.

Fig. 2 shows in perspective view the coupling piece between the motor armature shaft and working spindle.

Fig. 3 shows in longitudinal section the rear ball bearing of the motor shaft.

Fig. 4 shows partly in longitudinal section the brush arrangement in the rear part of the tool.

The small electric machine tool comprises a working spindle 1, a motor 2 and a switch 3. The working spindle 1 carries the clamping device or chuck 4. These parts are accommodated in a casing made of insulating material, such as artificial resin, this material being considerably lighter than any metal construction yet at the same time has great strength to resist fracture and damage. This casing is composed of a protecting sleeve 5, a casing part 6 for the working spindle, a casing part 7 for the motor with a casing part 8 for the switch. These casing parts are screwed together or connected in some other suitable manner. As shown in the drawing the assembled casing has a smooth contour free from corners and of suitable shape for a hand tool and can be more easily manipulated than the known electric or pneumatic tools. In the example illustrated the weight of the tool is only about 700 to 1200 grams according to the efficiency of the type. The motor rotates when running light at about 30,000 revolutions or more even up to 55,000 revs. per minute). A tongue 10 of the motor shaft 9 engages in a diametrical slot 14 in the other end of the coupling piece 12. The slots 11 and 14 are mutually displaced through an angle of 90°. The coupling piece 12 due to the slots is capable of radial and axial play relatively to the tongues 10 and 13, so that any axial differences between the motor shaft 9 and working spindle 1 are compensated by this coupling. The radial play is limited by rings 15 surrounding the slotted portions of the coupling piece. The coupling piece, besides preventing the transmission of vibrations and shocks to the motor shaft 9, further prevents any unintentional passage of current from the motor and switch compartment to the working spindle, such as might occur in the event of defects in the driving part of the machine tool.

A ring 16 which is perforated to allow the passage of the cooling air to the fan and which also accommodates the front ball bearing of the motor shaft, is pressed by the casing part 6 against the motor compartment casing 7, or exposes this compartment after the removal of part 6. A sleeve 17 on the end of motor shaft 9 projecting towards the working spindle is connected with the motor shaft by a transverse pin 18 and carries a fan 19.

The ball bearing for the motor shaft arranged on the side remote from the working spindle consists as also its front ball bearing of an outer bearing ring 20 and of an inner bearing ring 21. The outer bearing ring is surrounded by a sleeve-like steel rim 22. The outer bearing ring is inserted in or pressed into this steel rim. The rim 22 is slidable in a brass sleeve 35 pressed into the casing. The end of the rim 22 facing the commutator of the motor overlaps the ball bearing to about the diameter of the shaft. A spring ring or cover plate 23 is fitted on the motor shaft between this overlapping portion and the commutator of the motor. At its other end the rim 22 is extended beyond the width of the ball bearing and forms a lubricating chamber closed on its outer end by a cover plate 24. This cover plate is held in position by a spring ring 25. In the example illustrated the lubricating chamber is filled with a fabric 26 saturated with lubricant. A perforated plate 27 is provided for preventing the fabric from getting into the ball bearing. The spring ring or cover plate 23 is so fitted to the shaft to function as an oil ring to prevent the creeping of the liquid along the shaft and restrain the lubricant from contact with the commutator of the motor 2.

The current is supplied to brushes 28, as shown in Fig. 4, over bolts 29 engaging with their pointed ends in the brush casing or guide 30. The forward movement of the brushes under the action of springs 31 is limited by an abutment 32 in the casing. Consequently, brushes which are nearly worn out are automatically kept back, and the current being immediately interrupted so that the push springs cannot come into contact with the commutator of the motor. Thus, the damages to the commutator or armature as frequently occur in electric hand tools are prevented. The necessity of renewing the carbons is thus indicated by the sudden drop in efficiency of the machine.

The switch part 33 projecting from the casing is accommodated in a recessed portion of the casing 8. This recessed portion is formed by a rim 34 projecting from the casing around the switch part to about the same height as the end of the projecting switch part. The switch and the projecting rim are provided on the rear end of the motor casing. The projecting rim is preferably made in one piece with the casing 8 and surrounds the projecting switch part like a ring.

I claim:

1. In a small electric machine tool motor casing of hand tool form, a driven shaft in the casing, a ball bearing on the rear end of the shaft comprising an outer bearing ring, a sleeve-shaped steel rim surrounding said outer ring and adapted to facilitate the removal of said bearing, an extension on said rim forming a lubricating chamber for said ball bearing, and a separate sleeve fitted on the casing and adapted to receive said rim.

2. In a small electric machine tool motor casing of hand tool form, a driven shaft in the casing, a ball bearing on the rear end of the shaft comprising an outer bearing ring, a sleeve-shaped steel rim surrounding said outer ring and adapted to facilitate the removal of said bearing, an extension on said rim forming a lubricating chamber for said ball bearing, a perforated plate in said extension separating said chamber from said ball bearing, a fabric saturated with lubricant accommodated in said chamber, a cover plate in the rear end of said chamber, a spring ring securing said cover plate in said extension, and a separate sleeve fitted on the casing and adapted to receive said rim.

3. In a small electric machine tool motor casing of hand tool form, a driven shaft in the casing, a ball bearing on the rear end of the shaft comprising an outer bearing ring, a sleeve-shaped steel rim surrounding said outer ring and adapted to facilitate the removal of said bearing, an extension on said rim forming a lubricating chamber for said ball bearing, an inwardly bent portion on the front end of said rim to about the diameter of the motor shaft, and a separate sleeve fitted on the casing and adapted to receive said rim.

4. In a small electric machine tool motor casing of hand tool form, a driven shaft in the casing, a ball bearing on the rear end of the shaft comprising an outer bearing ring and adapted to facilitate the removal of said bearing, an extension on said rim forming a lubricating chamber for said ball bearing, an inwardly bent portion on the front end of said rim to about the diameter of the motor shaft, a spring ring on said shaft adjacent said bent over portion to prevent the creeping of lubricant along said shaft, and a separate sleeve fitted on the casing and adapted to receive said rim.

ROBERT SCHUMANN.